US012233375B2

(12) United States Patent
DeJong et al.

(10) Patent No.: US 12,233,375 B2
(45) Date of Patent: Feb. 25, 2025

(54) FILTRATION SYSTEMS WITH PROACTIVE PULSE CLEANING

(71) Applicant: Donaldson Company, Inc., Minneapolis, MN (US)

(72) Inventors: Richard P. DeJong, Eden Prairie, MN (US); Jason A. Tiffany, Bloomington, MN (US); Keith F. Alderson, Richfield, MN (US)

(73) Assignee: Donaldson Company, Inc., Bloomington, MN (US)

( * ) Notice: Subject to any disclaimer, the term of this patent is extended or adjusted under 35 U.S.C. 154(b) by 352 days.

(21) Appl. No.: 17/415,372

(22) PCT Filed: Dec. 17, 2019

(86) PCT No.: PCT/US2019/066936
§ 371 (c)(1),
(2) Date: Jun. 17, 2021

(87) PCT Pub. No.: WO2020/131926
PCT Pub. Date: Jun. 25, 2020

(65) Prior Publication Data
US 2022/0054965 A1 Feb. 24, 2022

Related U.S. Application Data

(60) Provisional application No. 62/781,438, filed on Dec. 18, 2018.

(51) Int. Cl.
B01D 46/71 (2022.01)
B01D 46/04 (2006.01)
(Continued)

(52) U.S. Cl.
CPC ............. B01D 46/71 (2022.01); B01D 46/04 (2013.01); B01D 46/2411 (2013.01);
(Continued)

(58) Field of Classification Search
None
See application file for complete search history.

(56) References Cited

U.S. PATENT DOCUMENTS 5,837,017 A 11/1998 Santschi et al.
6,958,118 B2 10/2005 Hill et al.
(Continued)

FOREIGN PATENT DOCUMENTS

AU 2010210024 9/2010
CN 102782267 11/2012
(Continued)

OTHER PUBLICATIONS

"First Office Action," for Chinese Patent Application No. 201980083559.6 mailed Jul. 5, 2022 (37 pages) with English Translation.
(Continued)

Primary Examiner — Brian A McCaig
(74) Attorney, Agent, or Firm — Pauly, DeVries Smith & Deffner LLC

(57) ABSTRACT

Included herein are filtration systems that can proactively pulse clean filter elements in response to anticipated changes, such as anticipated changes in filtration performance or anticipated changes in filtration system demand. In an embodiment, a filtration system is included having a filter element mount for a filter element, a compressed gas supply, and a valve, wherein opening the valve results in a pulse of gas directed at the filter element. A control circuit can control the valve. A communications circuit can receive data related to an anticipated change, such as data regarding an anticipated change in filtration performance and/or data regarding an anticipated change in filtration system demand. The control circuit can execute operations based on the anticipated change data such as adjusting a pressure drop threshold and initiating proactively opening the valve in the
(Continued)

absence of a pressure drop threshold being crossed. Other embodiments are also included herein.

20 Claims, 8 Drawing Sheets

(51) Int. Cl.
*B01D 46/24* (2006.01)
*B01D 46/42* (2006.01)
*B01D 46/44* (2006.01)
*B01D 46/46* (2006.01)

(52) U.S. Cl.
CPC ....... *B01D 46/4272* (2013.01); *B01D 46/429* (2013.01); *B01D 46/446* (2013.01); *B01D 46/46* (2013.01)

(56) References Cited

U.S. PATENT DOCUMENTS

| | | | |
|---|---|---|---|
| 8,673,040 | B2 | 3/2014 | Handley et al. |
| 8,715,384 | B2 | 5/2014 | Saraswathi et al. |
| 9,092,040 | B2 | 7/2015 | Fadell et al. |
| 9,782,711 | B2 * | 10/2017 | Barker ................. B01D 46/446 |
| 2008/0156719 | A1 | 7/2008 | Tabor |
| 2011/0023709 | A1 * | 2/2011 | Bosshard ............. B01D 46/442 96/417 |
| 2014/0208942 | A1 | 7/2014 | Scipio et al. |
| 2015/0114221 | A1 | 4/2015 | Ekanayake et al. |
| 2015/0202558 | A1 | 7/2015 | Barker |
| 2017/0252689 | A1 * | 9/2017 | Joshi ...................... B01D 46/71 |
| 2018/0073386 | A1 * | 3/2018 | Zhang .................. F01D 25/002 |
| 2018/0331643 | A1 * | 11/2018 | Ganireddy .............. H02P 9/007 |
| 2019/0209957 | A1 * | 7/2019 | Silvestro ................ B01D 46/70 |

FOREIGN PATENT DOCUMENTS

| | | |
|---|---|---|
| CN | 103282095 | 9/2013 |
| CN | 105980030 | 9/2016 |
| CN | 107149814 | 9/2017 |
| CN | 113507978 | 10/2021 |
| DE | 102014208875 | 11/2015 |
| EP | 0796645 | 9/1997 |
| EP | 2937128 | 10/2015 |
| JP | 2018034072 | 3/2018 |
| WO | 2020131926 | 6/2020 |

OTHER PUBLICATIONS

"Second Office Action," for Chinese Patent Application No. 201980083559.6 mailed Feb. 16, 2023 (40 pages) with English translation.
"International Preliminary Report on Patentability," for PCT Application No. PCT/US2019/066936 mailed Jul. 1, 2021 (12 pages).
"International Search Report and Written Opinion," for PCT Application No. PCT/US2019/066936 mailed Apr. 17, 2020 (17 pages).
"Operation and Maintenance Recommendations for Gas Turbine Inlet Air Filter Compartments," GE Energy Instruction Manual GEK 111330, Oct. 2005 (28 pages).
"First Examination Report," for Saudi Arabian Patent Application No. 521422282 mailed Jun. 22, 2023 (8 pages) with English Summary.
"Equipment Maintenance and Repair Procedures," Ministry of Chemical Industry or PRC, vol. 4, 2nd part, Instrumentation section, Aug. 31, 1993 (4 pages) No English Translation available.
"Final Rejection," for Chinese Patent Application No. 201980083559.6 mailed Sep. 22, 2023 (41 pages) with English Translation.
Zhang, Baojun "Water Treatment Engineering Technology," Chongqing University Press, Jan. 31, 2015 (3 pages) No English Translation available.
"Office Action," for European Patent Application No. 19845634.5 mailed Feb. 14, 2024 (4 pages).
"First Office Action," for United Arab Emirates Patent Application No. P6000993/21 mailed Jan. 19, 2024 (10 pages).
"Second Examination Report," for Saudi Arabian Patent Application No. 521422282 mailed Dec. 3, 2023 (1 page), English summary only.

* cited by examiner

FILTRATION SYSTEMS WITH PROACTIVE PULSE CLEANING

This application is being filed as a PCT International Patent application on Dec. 17, 2019, in the name of Donaldson Company, Inc., a U.S. national corporation, applicant for the designation of all countries, and Richard P. Dejong, a citizen of the U.S., Jason A. Tiffany, a citizen of the U.S., and Keith Alderson, a citizen of the U.S., inventors for all countries, and claims priority to U.S. Provisional Patent Application No. 62/781,438, filed Dec. 18, 2018, the contents of which are herein incorporated by reference in its entirety.

FIELD

Embodiments herein relate to filtration systems that pulse clean filter elements proactively. More specifically, embodiments herein relate to filtration systems that can proactively pulse clean filter elements in response to anticipated changes, such as anticipated changes in filtration performance or anticipated changes in filtration system demand.

BACKGROUND

Systems for filtering an air or gas stream laden with particulate matter include air filter assemblies that have filter elements disposed in a housing. The filter element may be a cartridge, bag or sock of a suitable fabric or pleated paper.

Such systems can be monitored by monitoring differential pressure. Differential pressure is the difference in pressure from the dirty side (filter side or dirty air plenum) to the clean side (clean air plenum) of a filtration system or dust collector. It is a measure of all resistances to airflow between the two chambers of the collector and typically includes the loss through the orifices of the tube sheet, the resistance of the clean filter media, and the resistance of particulates including dust collected on the filter media.

The accumulation of particulate materials on the filters can result in additional resistance to airflow going through the filtration system and a typically gradual increase in differential pressure drop. Therefore, differential pressure can be used to determine the relative condition of the filters as the dust builds up on the filters and can be used as an indicator of when cleaning of the filters is needed.

A typical cleaning system for the filter elements within dust collectors uses compressed air. The cleaning system includes an air manifold mounted on the collector connected to a compressed supply. Attached to the manifold are diaphragm valves that have tubes (blowpipes) that go into the collector and are lined up with each filter set.

When the valves are actuated, a pulse of air flows through the diaphragm valves and into the interior of the filter element resulting in a retrograde pressure wave that can be sufficient to clean the filter element by dislodging particulate matter thereon. Cleaning of the filter element in this manner can cause the differential pressure to be lowered until further particular matter accumulates on the filter element.

SUMMARY

Embodiments herein relate to filtration systems that can proactively pulse clean filter elements in response to anticipated changes, such as anticipated changes in filtration performance or anticipated changes in filtration system demand. In an embodiment, a filtration system is included having a filter element mount configured to retain a filter element, a compressed gas supply, and a valve in fluid communication with the compressed gas supply, wherein opening the valve results in a pulse of gas directed at the filter element. The filtration system can further include a control circuit configured to control the valve and a communications circuit. The communications circuit can receive data related to an anticipated change impacting the filtration system, the anticipated change data including at least one of data regarding an anticipated change in filtration performance and data regarding an anticipated change in filtration system demand. The control circuit can be configured to initiate opening the valve in response to a data input indicating that a pressure drop threshold has been crossed. The control circuit can be further configured to execute at least one operation based on the anticipated change data, the at least one operation including at least one of adjusting the pressure drop threshold based on the anticipated change data and initiating proactively opening the valve in the absence of the pressure drop threshold being crossed based on the anticipated change data.

In an embodiment, a filtration system is included having a filter element mount configured to retain a filter element, a compressed gas supply, and a valve in fluid communication with the compressed gas supply, wherein opening the valve results in a pulse of gas directed at the filter element. The filtration system can further include a control circuit configured to control the valve and a communications circuit. The communications circuit can receive data related to an anticipated change impacting the filtration system, the anticipated change data including at least one of data regarding an anticipated change in filtration performance and data regarding an anticipated change in filtration system demand. In some embodiments, the communications circuit can be in electrical and/or signal communication with the control circuit. The control circuit can be configured to initiate opening the valve according to a first mode of operation and a second mode of operation. The first mode of operation can include opening the valve in response to a data input indicating that a pressure drop threshold has been crossed. The second mode of operation can include opening the valve in response to a data input indicating that a pressure drop threshold has been crossed and at least one of adjusting the pressure drop threshold based on the anticipated change data and initiating proactively opening the valve in the absence of the pressure drop threshold being crossed based on the anticipated change data.

In an embodiment, a networked filtration system is included herein. The system can include a filtration system. The filtration system can include a filter element mount configured to retain a filter element, a compressed gas supply, and a valve in fluid communication with the compressed gas supply, wherein opening the valve results in a pulse of gas directed at the filter element. The system can also include a local control circuit configured to control the valve. The local control circuit can be configured to initiate opening the valve in response to a data input indicating that a pressure drop threshold has been crossed. The filtration system can further include a communications circuit and a control system in communication with the filtration system remotely through a data network. The remote control system can send instructions to the filtration system data based on an anticipated change impacting the filtration system, the anticipated change comprising at least one of an anticipated change in filtration performance and an anticipated change in filtration system demand. The instructions can include at least one of adjusting the pressure drop threshold and initiating proactively opening the valve in the absence of the pressure drop threshold being crossed.

In an embodiment, a networked filtration system is included herein. The filtration system can include a filter element mount configured to retain a filter element, a compressed gas supply, a valve in fluid communication with the compressed gas supply, wherein opening the valve results in a pulse of gas directed at the filter element, and a local control circuit configured to control the valve. The local control circuit can be configured to initiate opening the valve in response to a data input indicating that a pressure drop threshold has been crossed. The filtration system can further include a communications circuit and a control system in communication with the filtration system remotely through a data network. The remote control system can send data to the filtration system regarding an anticipated change impacting the filtration system, the anticipated change including at least one of an anticipated change in filtration performance and an anticipated change in filtration system demand.

In an embodiment, a method of operating a filtration system is included. The method can include opening a valve that results in a pulse of gas directed at a filter element. The valve can be opened in response to a data input indicating that a pressure drop threshold has been crossed. The method can further include calculating an anticipated change impacting the filtration system, the anticipated change comprising at least one of an anticipated change in filtration performance and an anticipated change in filtration system demand. The method can further include operating the valve based on the anticipated change comprising at least one of adjusting the pressure drop threshold and initiating proactively opening the valve in the absence of the pressure drop threshold being crossed.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
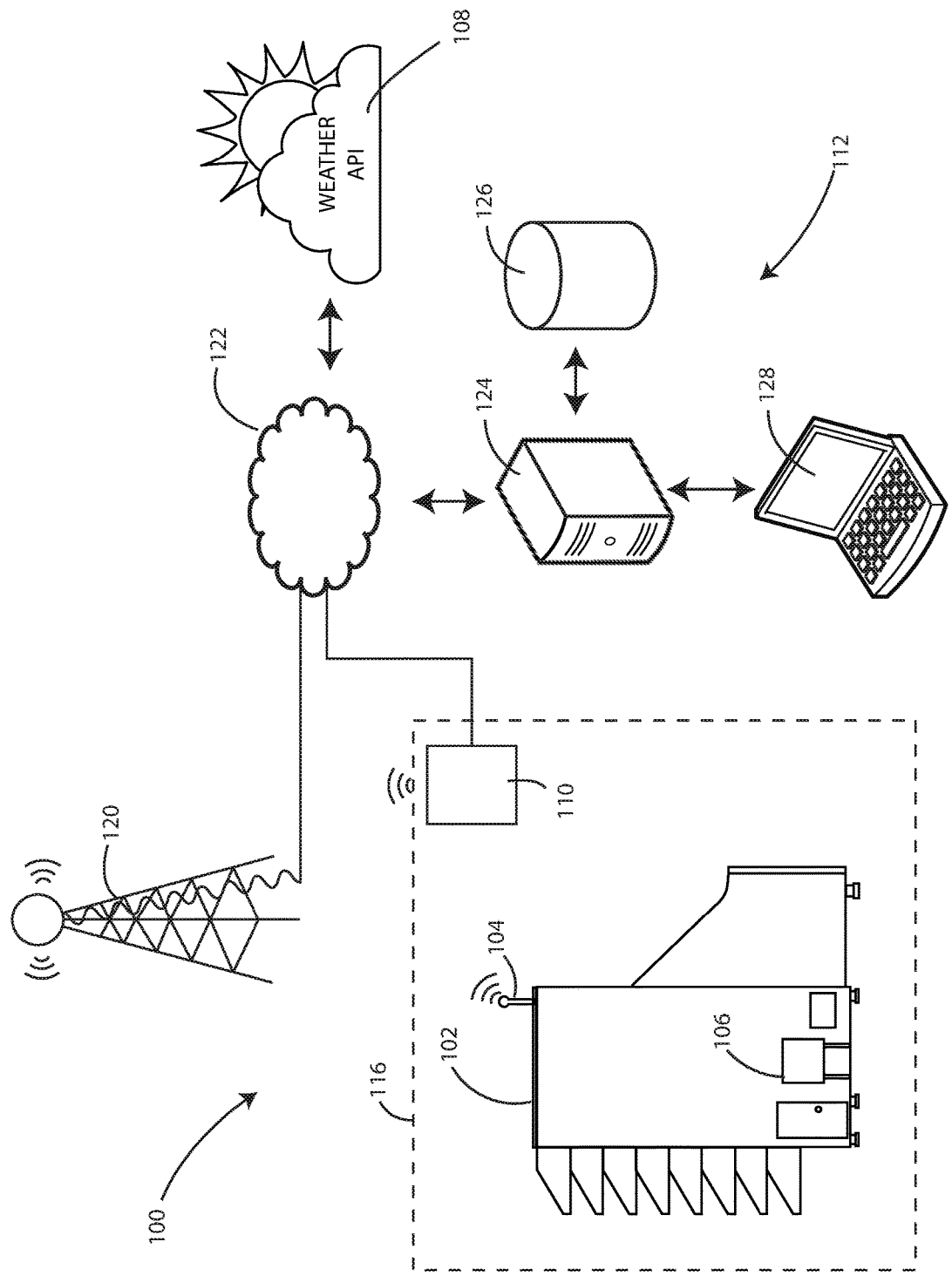
FIG. 1 is a schematic view of a filtration system data communication environment in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, a typical cleaning system for filter elements within a filtration system uses compressed air. The cleaning system typically includes an air manifold mounted on the collector connected to a compressed supply. Attached to the manifold are diaphragm valves that have tubes (such as blowpipes) that are lined up with the filter elements.

When the valves are actuated, a pulse of air (typically lasting roughly 100 milliseconds) flows through the diaphragm valves and into the interior of the filter element resulting in a retrograde pressure wave that can be sufficient to clean the filter element by dislodging particulate matter thereon. Cleaning of the filter element in this manner can cause the differential pressure to be lowered until further particular matter accumulates on the filter element.

In some scenarios, pulsing may occur on a fixed time interval during filtration system operation, such as every 10 seconds, 5 minutes, or the like. However, time-interval based pulse cleaning may not be an efficient use of compressed air and may shorten the life of the solenoids and the valves the actuate and, in some scenarios, the filter elements themselves. Therefore, various filtration systems implement a pulse-on-condition operational mode wherein pulse cleaning is initiated when differential pressure exceeds a threshold value. In some embodiments, pulse cleaning can continue until the differential pressure falls below a threshold value. In some scenarios, low and high set point threshold values can be used to control the cleaning cycle so it will start only when the differential pressure reaches a high point threshold, and will stop when the differential pressure reaches a low set point threshold. For example, if the high setting is 4-inches w.g. and the low setting is 2-inches w.g. (inches of water gauge), the cleaning cycle will start when the differential pressure reaches 4-inches w.g. and will continue to cycle until the differential pressure reaches the low setting of 2-inches w.g. when the cleaning cycle will stop. Cleaning will not start again until the differential pressure reaches 4-inches w.g. The benefits of cleaning based on differential pressure thresholds include compressed air savings opportunities, lower total emissions, longer life on solenoids and diaphragms valves, and potentially longer filter life.

However, it has been found that sometimes there can be advantages in proactively pulse cleaning filter elements when a change in filtration system performance and/or filtration system demand can be anticipated. In this way, differential pressure can be managed to be lower at the start of a period of decreased filtration system performance and/or increase filtration system demand, which can allow the filtration system to perform better than it otherwise would. As such, systems and methods herein can include performance enhancing features and capabilities including pulse cleaning filter elements with compressed gas in anticipation of a changing circumstance for the filtration system. In various embodiments, the anticipatory pulse cleaning can allow the system to consistently operate at a lower pressure drop than conventional pulse-on-condition systems.

In accordance with various embodiments herein, the mode of activating the pulse of gas can be changed in response to anticipated changes to the filter system, such as an anticipated change in the demand on the filtration system or an anticipated change in filtration performance.

In one exemplary scenario, a filtration system could be adversely impacted by a change in weather such as an increase in humidity. As such, an anticipated change in weather including an increase in humidity could amount to an anticipated decrease in filtration system performance. In response, the filtration system can proactively pulse compressed air through the filter elements to ensure the filter elements are clean in preparation for the anticipated weather-related decrease in performance of the filtration system.

In another exemplary scenario, a gas turbine can be part of an electrical grid system including solar power inputs. When contributions from the solar power inputs are decreased, more power from the gas turbines may need to be operated in order to provide sufficient power to the grid. Therefore, if clouds or other weather that would block sunlight and therefore reduce the output of the solar panels is expected, it may be anticipated that demand on the gas turbine will increase thereby increasing demand on an associated filtration system. In response, embodiments of filtration systems herein can proactively pulse compressed air through the filter elements to ensure the filter elements are clean in preparation for the anticipated increased demand on the system. Many other scenarios including anticipated changes in filtration system performance and/or filtration system demand are contemplated herein.

Proactive pulsing of filtration systems herein can take various forms. In some embodiments, pulsing to clean filter elements can be triggered proactively regardless of a fixed time interval or pulse-on-condition criterion being met. In some embodiments, the filtration system can change a fixed time interval used for pulse cleaning. In some embodiments, the filtration system can change (or lower) the value of a threshold that triggers the pulse compressed air cleaning system to operate, such as to more frequently clean the filter elements to maintain a lower pressure drop across the filter elements. In some embodiments, a high point threshold can be decreased. For example, a high set point threshold can be decreased by about 0.1, 0.2, 0.3, 0.4, 0.5, 0.6, 0.7, 0.8, 0.9, 1, 1.1, 1.2, 1.3, 1.4, 1.5, 1.6, 1.8, 2, 2.5, 3, 3.5, 4.0, 4.5, 5, 5.5, 6, 7, or 8 inches w.g. or more (or an amount falling within a range between any of the foregoing). In some embodiments, a low set point threshold can be decreased by about 0.1, 0.2, 0.3, 0.4, 0.5, 0.6, 0.7, 0.8, 0.9, 1, 1.1, 1.2, 1.3, 1.4, 1.5, 1.6, 1.8, 2, 2.5, 3, 3.5, 4, 5 or 6 inches w.g. or more (or an amount falling within a range between any of the foregoing).

Referring now to FIG. 1, a schematic view of a filtration system data communication environment 100 is shown. In some embodiments, the filtration system can be a networked filtration system, such as a filtration system that is part of a network. A filtration system 102, such as a filtration system for a gas turbine or a manufacturing environment, can include a communication unit 104 and a control unit 106 or control system. The communication unit 104 can include a communication circuit. The control unit 106 can include a control circuit.

The filtration system 102 can be for various purposes in outdoor or indoor settings including, but not limited to, filtering outdoor air for turbines or incoming air for manufacturing environments. Exemplary filtration systems are described in greater detail below.

The filtration system 102 can be within a work environment 116. The work environment 116 can represent a geographic area in which the filtration system 102 primarily operates. In other embodiments, the work environment 116 can represent a building in which the filtration system 102 is located within. Depending on the nature of the filtration system 102, the work environment 116 could be quite large (10s to 1000s of square miles) or relatively small (100s to 1000s square feet).

In some embodiments, the work environment 116 can be, for example, a gas turbine facility, a manufacturing facility, a production facility, or the like. In some embodiments, a gateway or repeater unit 110 can be disposed within the work environment 116. The gateway or repeater unit 110 can, in some embodiments, communicate wirelessly with the filtration system 102 and/or components thereof such as the communication unit 104 and/or the control unit 106. In some embodiments, the gateway or repeater unit 110 can be connected to an external data network 122, such as the Internet or various private networks.

The control unit 106 can include a local control circuit, such as a control circuit that is located within or in close proximity the filtration system 102. In various embodiments, the communication circuit can be in electrical communication with the local control circuit.

The filtration system 102 can also include a communication circuit as mentioned above. The communication circuit can be in electrical communication with the local control circuit. In some embodiments, the data communication environment 100 can further include a remote control system 112 in communication with the filtration system 102 remotely through the data network 122. The remote control system 112 can include a server 124, a database 126, and a user device 128.

The remote control system 112 can be configured to send instructions to the control unit 106 and/or the filtration system 102 based on an anticipated change impacting the filtration system 102. In some embodiments, the anticipate change can include an anticipate change in filtration performance. In some embodiments, the anticipated change can include an anticipated change in filtration system demand. In some embodiments, "remote" can refer to a component that is external to the filtration system 102. In some embodiments, "remote" can refer to a component that is outside of the work environment 116.

In some embodiments, the data network 122 can be a packet-switched network. In some embodiments, the gateway or repeater unit 110 can also include data network router functionality. In various embodiments, the remote control system 112, the control unit 106, or the communication unit 104 can send or receive data or instructions to/from an application programming interface (API) 108, such as a weather API.

It will be appreciated that weather APIs are available from a number of service providers including, but not limited to, Yahoo Weather, OpenWeatherMap, AccuWeather, Dark Sky, and the National Weather Service, amongst others. In some embodiments, the weather API can send information regarding past, present, or future weather conditions for the work environment 116, an area served by the filtration system 102, or an area served by a system in which the filtration system 102 is part of. In various embodiments, the API 108 can be connected to the data network 122 to communicate with other portions of the network.

In various embodiments, interface with the API can follow a SOAP or REST based architecture and can include communications in a JSON, XML, or YAML format, a derivative format based on one of these, or another data format. Communications with the API can include a request including one or more of a URL, method, headers, and a body. API responses can include one or more of status codes, headers, and a body.

In some embodiments, wireless signals from one or more of the components such as the filtration system 102, communication unit 104, control unit 106, gateway or repeater unit 110, can be exchanged with a wireless communication tower 120 (or antenna array), which could be a cellular tower or other wireless communication tower. The wireless communication tower 120 can be connected to a data network 122, such as the Internet or another type of public or private data network, packet-switched or otherwise.

The data network 122 can provide for one-way or two-way communication with other components that are external to or remote from the work environment 116. For example, a server 124 or other processing device can receive electronic signals containing data from or send electronic signals containing data to one or more components such as the filtration system 102, communication unit 104, control unit 106, gateway or repeater unit 110, or the like. The server 124 can interface with a database 126 to store data. In some embodiments, the server 124 (or a particular device that is part of the server system) can interface with a user device 128, which can allow a user to query data stored in the database 126.

Data produced by the filtration system 102 can be of various types. In some embodiments, data produced by the filtration system 102 can include data regarding pressure drop, pressure drop change over time, filter removal events and/or counts of same, filter hours of usage, filter installation dates and times and/or counts of installation events, and the like.

Figure 2:
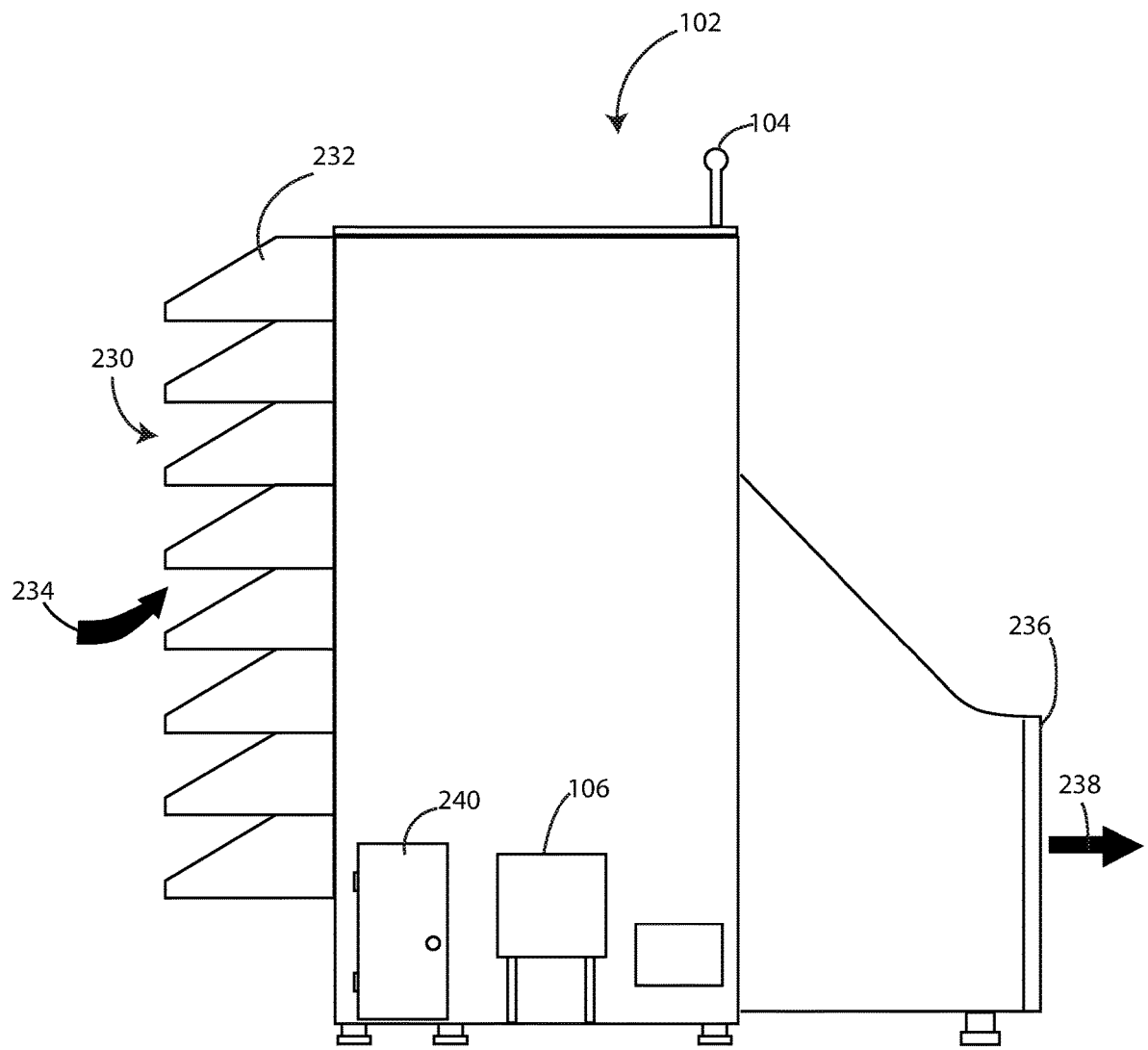
FIG. 2 is a schematic side view of a filtration system in accordance with various embodiments herein.

Filtration systems herein can take on many different forms and can be those suitable for many different applications. Referring now to FIG. 2, a schematic side view of a filtration system 102 is shown in accordance with various embodiments herein. FIG. 2 shows a filtration system 102 in the form of a gas turbine air inlet filtration system. It is understood the filtration system 102 could be used as air inlet filtration system for other applications as well. In addition, it will be appreciated that embodiments described herein are not limited to air intake/inlet applications, but can also include dust/particulate collector applications (cartridge based, bag based, and the like), exhaust filtration applications, etc.

The filtration system 102 can include an air inlet 230. In some embodiments, the air inlet 230 can include one or more hoods 232, such as to prevent rain, snow, or other precipitation from entering the filtration system 102. In some embodiments, the hoods 232 can include a screen or mesh to prevent leaves, sticks, branches, or other large particulate from entering the filtration system 102.

Dirty or unfiltered air can enter the filtration system 102 at the air inlet 230 in the direction of arrow 234. The air can pass through a filter element (shown in FIG. 3) to remove dust or other particulate from the air. The air can then be directed out of an air outlet 236 in the direction of arrow 238. In various embodiments, the air outlet 236 can be coupled to a supply air duct that can direct the clean or supply air to the desired location of use. In other embodiments, the air outlet 236 can be directly coupled to the air inlet of a gas turbine or other equipment where the supply air is desired.

The filtration system 102 can include a door 240. The door 240 can provide access to the interior of the filtration system 102, such as to allow a user to change the filtration elements or otherwise service the interior portion of the filtration system 102.

Figure 3:
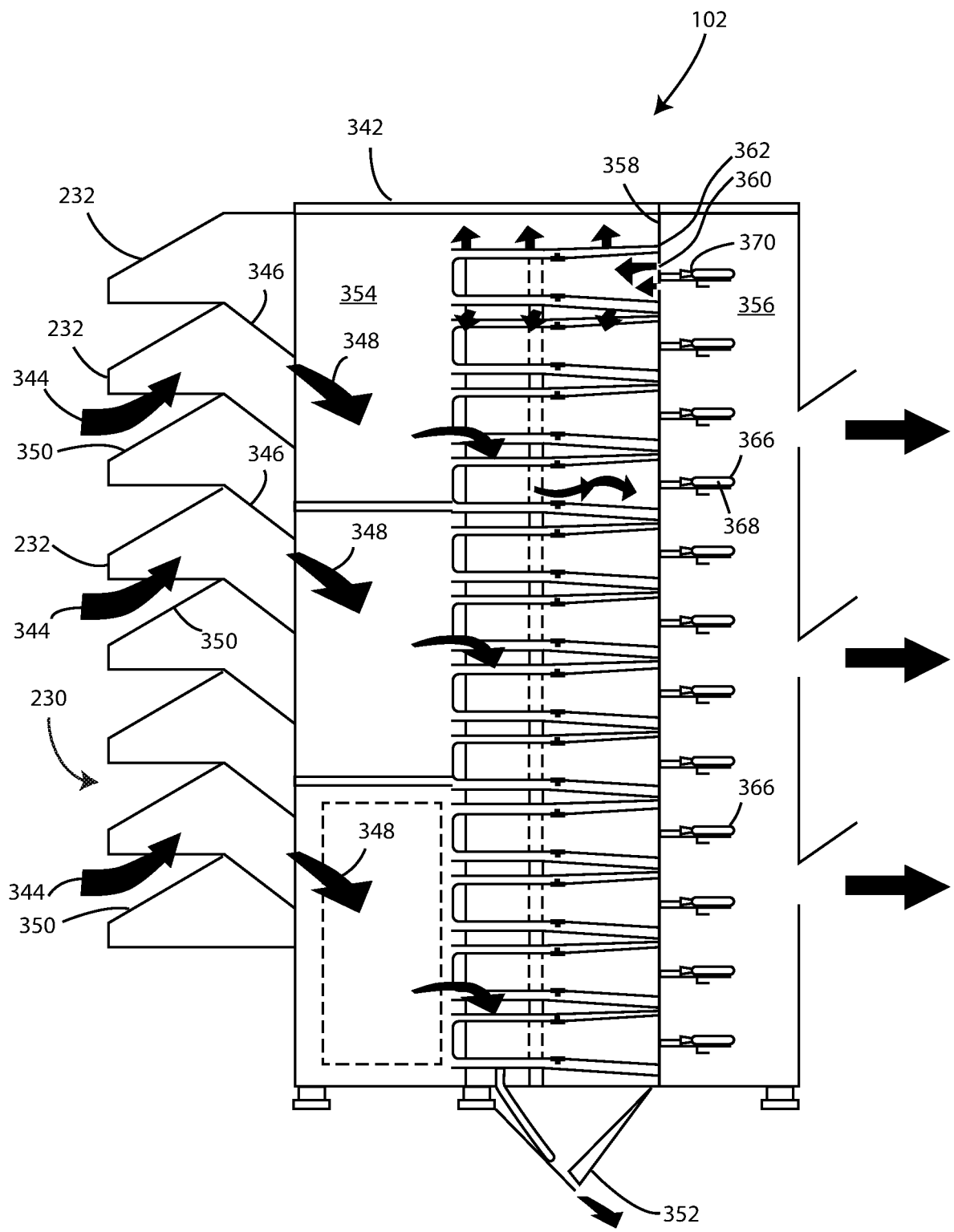
FIG. 3 is a schematic side view of the inside of a filtration system in accordance with various embodiments herein.

In FIG. 3, a schematic, cross-sectional, depiction of filtration system 102 for a gas turbine from FIG. 2 is depicted. The filtration system 102 can include a chamber 342 having an air inlet 230 and an air outlet 236. Unfiltered air can enter the chamber 342 through a plurality of vertically spaced hoods 232 positioned along the air inlet 230. The inlet hoods 232 can be configured such that air entering the inlet hoods 232 is first directed in an upward direction indicated by arrow 344, and then deflected by deflector plates 346 in a downward direction indicated by arrow 348. The initial upward movement of air can cause some particulate material and moisture from the air stream to settle or accumulate on lower regions 350 of the inlet hoods 232. The subsequent downward movement of air can force dust within the chamber 342 downward toward a dust collection hopper 352 located at the bottom of the chamber 342. It should also be noted that air inlet 230 may have vanes, screens, or other mechanical moisture separator inlets.

The chamber 342 of the filtration system 102 can be divided into an upstream volume 354 and a downstream volume 356 by a tube sheet 358 (referred to also as partition 358). The upstream volume 354 generally represents the "dirty air section" of the filtration system 102, while the downstream volume 356 generally represents the "clean air section" of the filtration system 102. The partition 358 (or tube sheet) can define a plurality of apertures 360 for allowing air to flow from the upstream volume 354 to the downstream volume 356. The tube sheet 358 can include a filter element mount 362. The filter element mount 362 can be configured to retain or hold a filter element 364. Each aperture 360 can be covered by an air filter element 364 in the filter element mount 362 and located in the upstream volume 354 of the chamber 342.

In various embodiments, the filter elements 364 used with embodiments herein can include, but are not limited to, cartridge filters, bag filters, POWERCORE™ brand filters, mist filters, panel filters, and the like. In some embodiments, the filter elements can have a filter medium comprising at least a PTFE layer or comprises a PTFE layer on a suitable support layer. The PTFE layer can be on the upstream side of the medium.

The filter elements 364 can be in fluid communication with the air inlet 230. The filter elements 364 can be arranged and configured such that air flowing from the upstream volume 354 to the downstream volume 356 passes through the filter elements 364 prior to passing through the apertures 360.

In general, during filtering, air is directed from the upstream volume 354 through the filter elements 364. After being filtered, the air flows through the partition 358, via apertures 360, into the downstream clean air volume 356. The clean air is then drawn out from the downstream volume 356 and into a gas turbine intake, not shown.

In various embodiments, each aperture 360 of the partition 358 includes a pulse jet air cleaner 366 mounted in the downstream volume 356. The pulse jet air cleaner 366 can include a compressed gas supply 368 and a valve 370 in fluid communication with the compressed gas supply 368. In some embodiments, the valve 370 can include a solenoid operated valve or a diaphragm valve. In various embodiments, the compressed gas supply 368 can include a gas supply manifold 372. In some embodiments, the gas supply manifold 372 is configured to direct compressed air to each of the valves 370.

Opening the valve 370 can result in a pulse of gas directed at the filter element 364, such as to clean the filter or remove particulate build up on the dirty side of the filter. The pulse of gas can be directed at the filter element 364 in the reverse direction of normal airflow through the filter element 364, i.e. from the downstream volume 356 side of the filter element 364, such as to shake or otherwise dislodge particular material trapped in or on filter element 364.

As mentioned above, in some embodiments, the filtration system 102 can include a local control circuit. The local control circuit can be configured to control the valves 370, such as for compressed gas cleaning of the filter elements 364. The control circuit can be configured to initiate opening the valves 370 in response to a data input indicating that a pressure drop threshold has been crossed, such as to clean the filters as an increased pressure drop across the filters can represent dirty filters.

As further mentioned above, in various embodiments, the filtration system 102 can receive instructions, such as from the data network 122. In various embodiments, the instructions can include adjusting a pressure drop threshold, such as lowering the threshold or raising the threshold. In various embodiments, the instructions can include proactively opening the valve in the absence of a pressure drop threshold being crossed, such as to proactively clean the filters.

Figure 4:
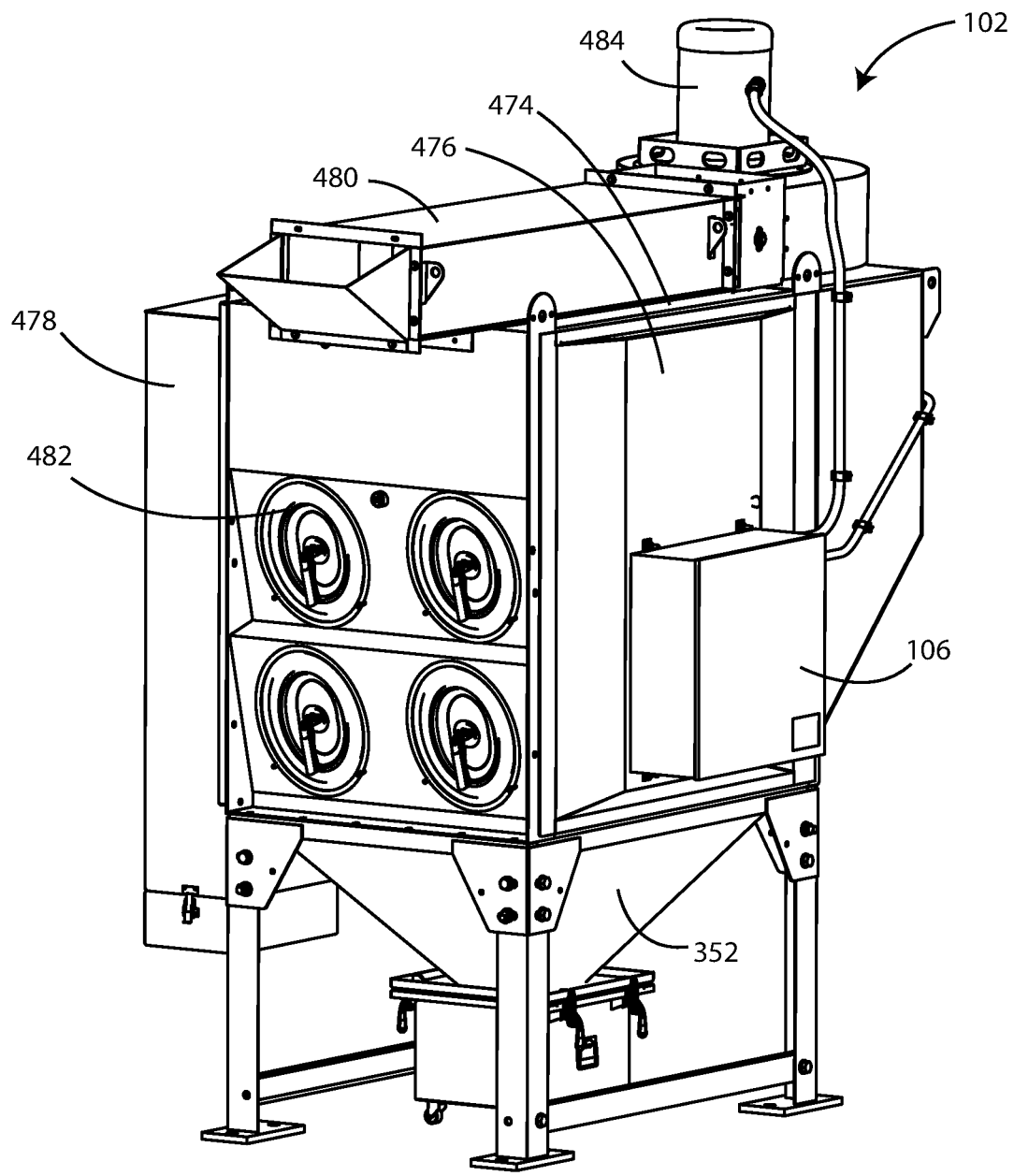
FIG. 4 is a perspective view of a filtration system in accordance with various embodiments herein.

Filtration systems herein can include both those installed outdoors and those installed indoors. Referring now to FIG. 4, a schematic perspective view is shown of another air filtration system 102 in accordance with embodiments herein. In this shown embodiment, the air filtration system 102 is generally in the shape of a box and includes an upper wall panel 474, and two pairs of opposite side wall panels 476 (one of which is depicted in FIG. 4). It will be appreciated, however, that the air filtration system 102 can take on many different shapes and configurations. In some embodiments, such as shown in FIG. 4, the filtration system 102 can form a part of an industrial air filtration system, such as for a manufacturing or production facility. In some embodiments, these filtration systems 102 can be designed to be indoors.

The air filtration system 102 can include a dirty air conduit or air inlet 478 for receiving dirty or contaminated air (i.e., air with particulate matter therein) into the air filtration system 102. A clean air conduit or air outlet 480 (see, e.g., FIG. 5) can be provided for venting clean or filtered air from the air filtration system 102. The air filtration system 102 can include access openings 482 for multiple filter elements (not shown in FIG. 4). In use, each of the access openings 482 can be sealed by a cover (not shown) such that dirty air entering the air filtration system 102 does not escape through the access openings 482.

The air filtration system 102 may also include a hopper 352 to collect particulate matter separated from the dirty air stream as described herein. The hopper 352 can include sloped walls to facilitate collection of the particulate matter and can, in some embodiments, include a driven auger or other mechanism for removing the collected particulate matter.

In some embodiments, the air filtration system 102 can include a fan or blower 484 to provide movement of air through the air filtration system 102, typically mounted so as to be pulling air through the system from the clean side. However, in other embodiments, air can be pushed or pulled through the system with a fan or other equipment that is not part of the air filtration system 102. The air filtration system 102 can include a control unit 106, which can include a control circuit for the filtration system 102.

Figure 5:
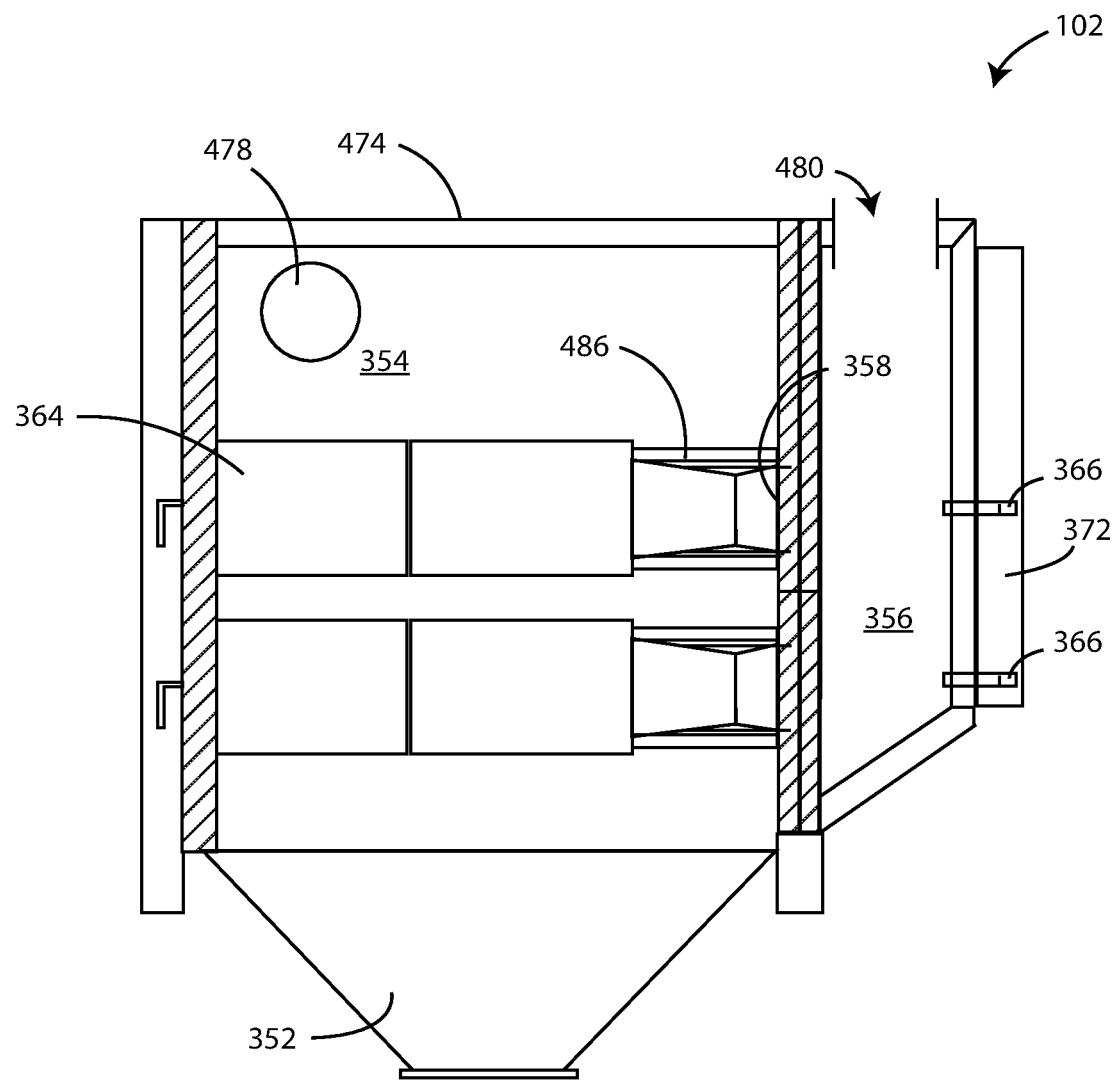
FIG. 5 is a schematic side view of the inside of a filtration system in accordance with various embodiments herein.

Referring now to FIG. 5, a schematic cross-sectional view is shown of some aspects of an air filtration system 102 in accordance with various embodiments herein. The interior of the air filtration system 102 includes a tube sheet 358 that separates the interior of the housing into a downstream volume 356 and an upstream volume 354.

The air filtration system 102 can include pulse collectors 486 and filter elements 364 in the upstream volume 354 (dirty side). The pulse collectors 486 can be attached to the tube sheet 358 over an aperture in the tube sheet 358 (not seen in FIG. 5) such that a pulse of air from the pulse jet air cleaners 366 passing through the pulse collector 486 enters an interior volume of the filter elements 364. Air can be provided to the jet air cleaners 366 from a gas supply manifold 372, which itself can receive compressed air from an air compressor or central source of plant compressed air.

As discussed above, the filtration system 102 can include a control circuit configured to control the one or more valves 370. In various embodiments, the control circuit can be in electrical communication with the communication circuit, such as to exchange data or instructions. The communication circuit can receive data, such as from data network 122, related to an anticipated change impacting the filtration system, such as data regarding an anticipated change in filtration performance or data regarding an anticipated change in filtration system demand. The control circuit can be configured to initiate opening the valve 370 in response to a data input indicating that a pressure drop threshold has been crossed. In some embodiments, the control circuit can be further configured to execute at least one operation based on the anticipated change data. In various embodiments, the operation can include adjusting the pressure drop threshold based on the anticipated change data and/or initiating proactively opening the valve in the absence of the pressure drop threshold being crossed based on the anticipated change data. In some embodiments, initiating proactively opening the valve can include notifying a system operator, such as sending a notification and/or displaying an alert notification on a screen. The system operator can then take action to open the valve. In some embodiments, initiating proactively opening the valve can include sending a control signal (or command) to the valve to cause it to open.

In some embodiments, the control circuit is configured to initiate opening the valve according to a first mode of operation and a second mode of operation. The first mode of operation can include opening the valve in response to a data input indicating that a pressure drop threshold has been crossed. The second mode of operation can include opening the valve in response to a data input indicating that a pressure drop threshold has been crossed, and adjusting the pressure drop threshold based on the anticipated change data or initiating proactively opening the valve in the absence of the pressure drop threshold being crossed based on the anticipated change data.

In some embodiments, the second mode of operation is only engaged if a filter element of a particular type is mounted on the filter element mount. In some embodiment, the filter element can include an RFID chip, barcode or other identification that can be read by the system. In some cases, the filter element mount can include an identification reader element to recognize the type of filter installed in the mount. The identification reader element can be in electrical communication with the control circuit to relay the read identification information.

Figure 6:
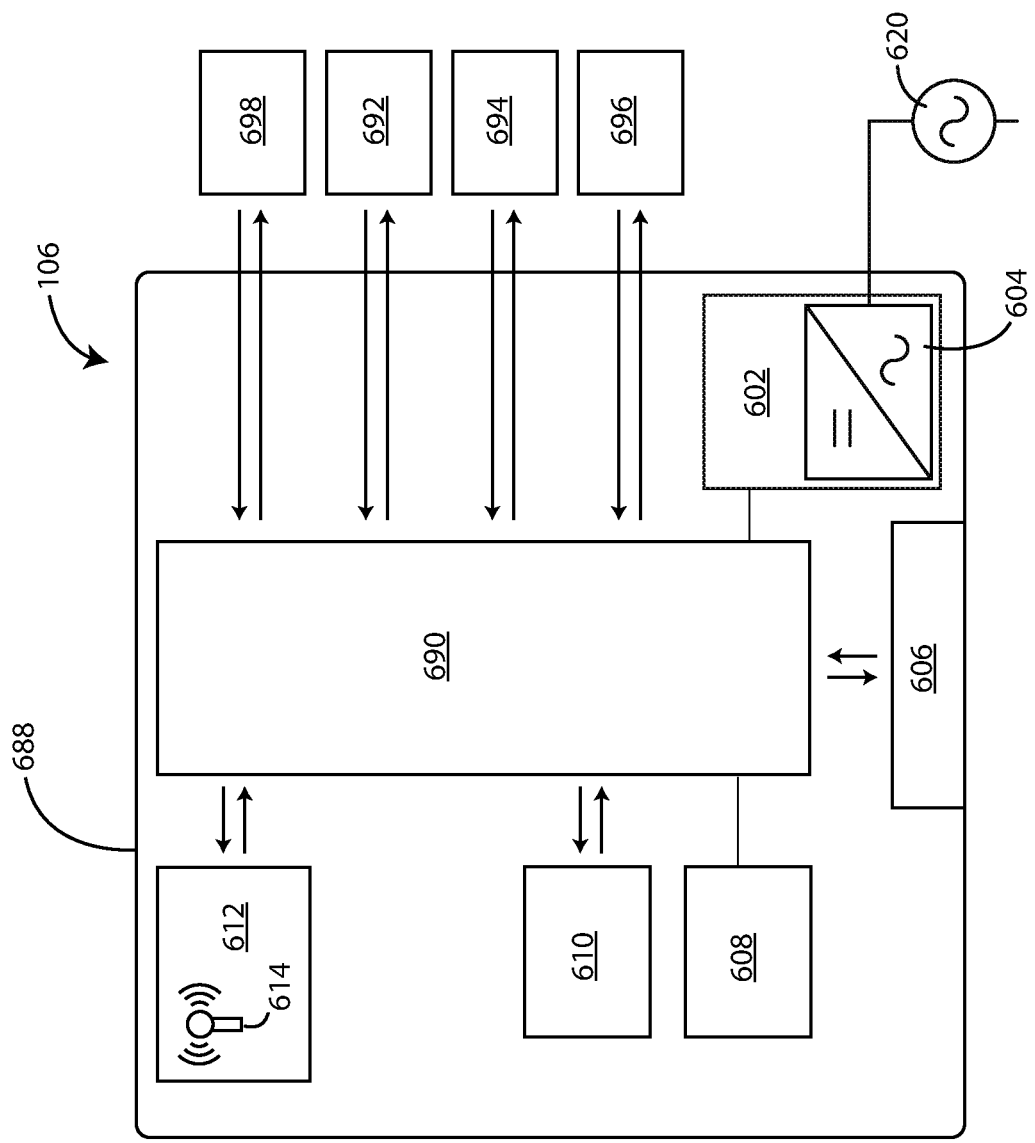
FIG. 6 is a schematic diagram of a control system in accordance with various embodiments herein.

Referring now to FIG. 6, a schematic diagram is shown of elements of a control unit 106 in accordance with various embodiments herein. It will be appreciated that a greater or lesser number of components can be included with various embodiments and that this schematic diagram is merely illustrative. The control unit 106 can include a housing 688 and a control circuit 690.

The control circuit 690 can include various electronic components including, but not limited to, a microprocessor, a microcontroller, a FPGA (field-programmable gate array) chip, an application specific integrated circuit (ASIC), or the like.

In various embodiments, the control unit 106 can include a first pressure sensor 692 (as used herein, reference to a pressure sensor shall include a pressure transducer unless the context dictates otherwise) and a second pressure sensor 694. In some embodiments, the first pressure sensor 692 can be in fluid communication with the upstream volume or dirty air chamber and the second pressure sensor 694 can be in fluid communication with the downstream volume or clean air chamber, such as to measure the pressure drop across the filter elements.

In various embodiments, the control unit 106 can include a third pressure sensor 696. The third pressure sensor 696 can be in fluid communication with the compressed air manifold. As such, the third pressure sensor 696 can be in fluid communication with a compressed gas supply.

Pressure sensors herein can be of various types. Pressure sensors can include, but are not limited to, strain gauge type pressure sensors, capacitive type pressure sensors, piezoelectric type pressure sensors, and the like. In some embodiments, pressure sensors herein can be MEMS-based pressure sensors.

The processing power of the control circuit 690 and components thereof can be sufficient to perform various operations including various operations on data from sensors (such as pressure sensors 692, 694, and 696) including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting filter element EOL (end of life), identifying an EOL condition, predicting performance, predicting costs associated with replacing filter elements vs. not-replacing filter elements, and the like.

Normalizing operations performed by the control circuit 690 can include, but are not limited to, adjusting one or more values based on another value or set of values. As just one example, pressure drop data reflective of pressure drop across a filter element can normalized by accounting for air flow rate or a value that serves as a proxy thereof.

In various embodiments the control circuit can calculate a time for replacement of a filter element and generate a signal regarding the time for replacement. In various embodiments, the control circuit can calculate a time for replacement of a filter element and issue a notification regarding the time for replacement through a user output device. In various embodiments, the control circuit can calculate a time for replacement of a filter element based on signals from the first pressure sensor and the second pressure sensor. In various embodiments, the control circuit can calculate a time for replacement of a filter element based on signals from the first pressure sensor and the second pressure sensor and an external input. The external input can be received from a system user or from a remote location through a data communication network.

In various embodiments, control circuit initiates an alarm if a predetermined alarm condition has been met. The alarm condition can include one or more a maximum value for a signal received from the first pressure sensor, a minimum value for a signal received from the first pressure sensor, a maximum value for a signal received from the second pressure sensor, a minimum value for a signal received from the second pressure sensor, a maximum difference between a value for a signal received from the first pressure sensor and a value for a signal received from the second pressure sensor, and a minimum difference between a value for a signal received from the first pressure sensor and a value for a signal received from the second pressure sensor.

In various embodiments, the control circuit 690 can be configured to calculate a value correlated to a fluid flow rate through the filtration system based on a value provided by the first pressure sensor and a value provided by the second pressure sensor. In some embodiments, the control circuit 690 can be configured to calculate a value correlated to a fluid flow rate through the filtration system based on a static pressure value, wherein the static pressure value by a signal from at least one of the first pressure sensor and the second pressure sensor. In some embodiments, the control circuit can be configured to calculate a value correlated to a fluid flow rate through the filtration system based on a differential pressure value and a static pressure value, wherein the differential pressure value is determined by a signal from both the first pressure sensor relative and the second pressure sensor and the static pressure value by a signal from one of the first pressure sensor and the second pressure sensor.

In some embodiments, the control unit 106 can include a fourth sensor 698, such as an accelerometer, a barometric sensor, an ambient temperature sensor, a humidity sensor, and a light sensor. For example, the control unit 106 can include a 3-axis accelerometer. The 3-axis accelerometer can be used to detect vibrations transmitted from or within the filtration system. The vibrations can result from various events such as periodically pulsing a brief jet of pressurized air into the interior of the filter element to reverse the air flow through the filter element and/or valve(s) opening or closing to accomplish the same. In other examples, the fourth sensor 698 can be used in combination with anticipated change data, such as to confirm the anticipated change. In some embodiments, the fourth sensor 698 can be used to confirm the humidity or the wind speed.

In some cases, a fourth sensor 698 or additional sensor can be mounted in the housing 688. In some embodiments, an additional sensor can be mounted in the filtration system, such as in the air inlet or air outlet. In various embodiments, an additional sensor (which could be a fifth sensor, or sixth sensor, or more or less) can be mounted outside of the filtration system, such as to measure wind speed or solar light.

In various embodiments, the control unit 106 can include a power supply circuit 602. In some embodiments, the power supply circuit 602 can include various components including, but not limited to, a rectifier 604, a capacitor, a power-receiver such as a wireless power receiver, a transformer, a battery, and the like. The power supply circuit 602 can be in electrical communication with a source of power 620.

In various embodiments the control unit 106 can include an output device 606. The output device 606 can include various components for visual and/or audio output including, but not limited to, lights (such as LED lights), a display screen, a speaker, and the like. In some embodiments, the output device can be used to provide notifications or alerts to a system user such as current system status, an indication of a problem, a required user intervention, a proper time to perform a maintenance action, or the like.

In various embodiments the control unit 106 can include memory 608 and/or a memory controller. The memory can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more meta-stable states, and remain in one of these states until changed by an external input. Data storage can be based on such flip-flop containing circuits. Data storage can also be based on the storage of charge in a capacitor or on other principles. In some embodiments, the non-volatile memory 608 can be integrated with the control circuit 690.

In various embodiments the control unit 106 can include a clock circuit 610. In some embodiments, the clock circuit 610 can be integrated with the control circuit 690. While not shown in FIG. 6, it will be appreciated that various embodiments herein can include a data/communication bus to provide for the transportation of data between components. In some embodiments, an analog signal interface can be included. In some embodiments, a digital signal interface can be included.

In various embodiment the control unit 106 can include a communications circuit 612. In various embodiments, the communications circuit can include components such as an antenna 614, amplifiers, filters, digital to analog and/or analog to digital converters, and the like. In some embodiments, the communications circuit can be in electrical and/or signal communication with the control circuit 690.

In some embodiments, the control circuit initiates a transitory change in a data recording parameter based on a signal received from the third pressure sensor. In some embodiments, the transitory change in the data recording parameter comprises increasing the resolution of the recorded data.

In some embodiments, the first pressure sensor and the second pressure generate signals discontinuously. In some embodiments, the first pressure sensor and the second pressure generate signals at predetermined time intervals.

Methods

Figure 7:
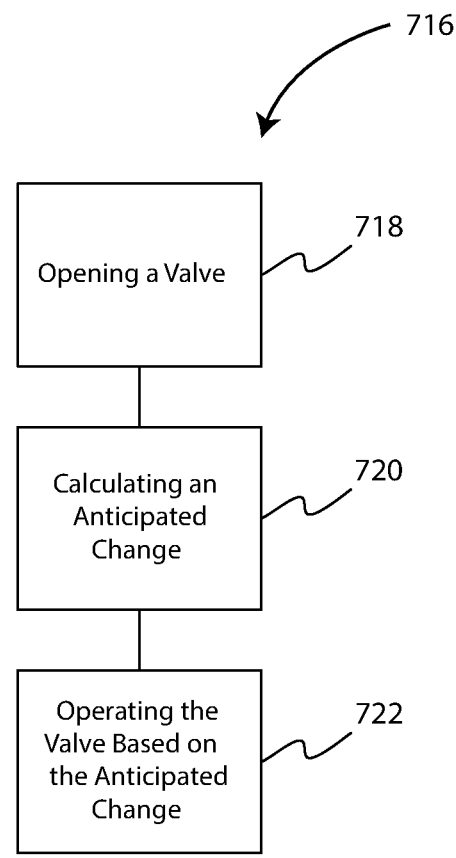
FIG. 7 is a flow chart depicting a method in accordance with various embodiments herein.

FIG. 7 shows a flow chart depicting a method 716 in accordance with various embodiments herein. The method 716 of operating a filtration system can include opening a valve that can result in a pulse of gas directed at a filter element 718 as part of a first operational mode, which can be a default mode. In various embodiments, the valve can be opened in response to a data input indicating that a pressure drop threshold has been crossed, such as to suggest the filter elements are dirty.

The method 716 can further include calculating an anticipated change impacting the filtration system 720. In some embodiments, the anticipated change can include an anticipated change in filtration performance or an anticipated change in filtration system demand.

In some embodiments, the method 716 can further include operating the valve based on the anticipated change 722, which can be a second operational mode. In various embodiments, operating the valve based on the anticipated change can include adjusting the pressure drop threshold or initiating proactively opening the valve in the absence of the pressure drop threshold being crossed.

In some embodiments, lowering the pressure drop threshold can result in the filter elements being cleaned (by opening the valves) more frequently. This can result in overall lower average pressure drops across the system. In some embodiments, proactively opening the valves can ensure the filter elements are clean, such as prior to an anticipated increased demand on the system.

Pulse Jet Air Cleaner Operation

In various embodiments, filtrations systems herein can include an air manifold connected to a compressed air supply. Attached to the manifold are diaphragm valves (or other valves) that may have tubes (blowpipes) that are lined up with each filter element or filter element set. Inside each diaphragm valve is a rubber diaphragm that holds equal pressure on both sides of the diaphragm valve sealing the manifold from each blowpipe. A solenoid enclosure can be included with generally the same number of solenoid valves as there are diaphragm valves. A tube connects each solenoid valve to a diaphragm valve. The solenoid valve plunger assembly allows air to escape through an outlet port when energized, allowing air to bleed off the back of the diaphragm valve. This action allows compressed air from the manifold to enter the blowpipe directing the air into the filter elements to facilitate cleaning. This pulse of compressed air has a duration from 80 to 120 milliseconds that cleans the filters from the inside, knocking the particulates off the outside surface of the filter dement. While this is one specific example of how pulse cleaning can be performed, it will be appreciated that there are other approaches to pulse cleaning contemplated herein and the scope herein is not particularly limited.

In some embodiments, the pulse jet air cleaners can be sequentially operated from the top to the bottom of the chamber to eventually direct the dust particulate material blown from the filters into the lower hopper, for removal. In many air pulse jet cleaning applications, a useful air pressure is generally within the range of 60 to 1500 psi. In some embodiments stream of liquid, such as water, soaps, degreasers, and solvents of any kind can also dislodge particulate from the PTFE layer alone or in conjunction with the reverse air. In many liquid jet applications, a useful liquid pressure is generally within the range of 0 to 1.20 psi.

The properties of filter element can be such that captured particulate matter will not easily adhere to the filter element in typical applications. By locating a PTFE layer on the upstream side of the filter element, the layer can be easily accessible for cleaning. The cleaning of the PTFE layer can therefore be readily accomplished by various means such as air pulse cleaning or upstream washing with liquid or air. As a result, the useful service life of the filter medium can be significantly increased when the PTFE layer is located on the upstream side of the filter medium. Further, because a PTFE layer can be applied to virtually any size and style of filter medium, retrofit installations in existing systems can be readily accomplished without the need for extensive equipment modification. Thus, a gas turbine owner or operator can economically obtain a filter that has both a higher efficiency and better moisture removal characteristics than most typical filters.

Proactive Pulse Cleaning

As discussed above, in various scenarios, an anticipated change in filtration performance or an anticipated change in filtration system demand can be calculated or can be received in data sent to the filtration system. In these scenarios, the filtration system can be prepared through proactive pulse cleaning to accommodate the change in filtration performance or change in filtration system demands prior to the change taking place. This can result in a more efficient filtration system, since the system can stay ahead of the changes and not be forced to "catch up" to the change.

Proactive pulsing of filtration systems herein can take various forms. In some embodiments, the pressure drop threshold, such as the pressure drop across the filter elements that triggers the valves to be opened, can be lowered. Lowering the pressure drop threshold can result in more frequent opening of the valves and cleaning of the filter elements. In other embodiments, the pressure drop threshold can be raised, such as to return the system to a "normal" or "default" mode of operation after a period of time with increased demands on the filtration system or filtration performance.

In some embodiments, pulsing to clean filter elements can be triggered proactively regardless of a fixed time interval or pulse-on-condition criterion being met. In some embodiments, the filtration system can change a fixed time interval used for pulse cleaning. In some embodiments, the filtration system can change (or lower) the value of a threshold that triggers the pulse compressed air cleaning system to operate, such as to more frequently clean the filter elements to maintain a lower pressure drop across the filter elements. In some embodiments, a high point threshold can be decreased. For example, a high set point threshold can be decreased by about 0.1, 0.2, 0.3, 0.4, 0.5, 0.6, 0.7, 0.8, 0.9, 1, 1.1, 1.2, 1.3, 1.4, 1.5, 1.6, 1.8, 2, 2.5, 3, 3.5, 4.0, 4.5, 5, 5.5, 6, 7, or 8 inches w.g. or more (or an amount falling within a range between any of the foregoing). In some embodiments, a low set point threshold can be decreased by about 0.1, 0.2, 0.3, 0.4, 0.5, 0.6, 0.7, 0.8, 0.9, 1, 1.1, 1.2, 1.3, 1.4, 1.5, 1.6, 1.8, 2, 2.5, 3, 3.5, 4, 5 or 6 inches w.g. or more (or an amount falling within a range between any of the foregoing).

In some embodiments, proactive pulsing of filtration systems herein can include increasing the frequency of timed cleaning pulses and/or decreasing time intervals between cleaning pulses. For example, an existing time based pulsing schedule can have its frequency increased by 10, 20, 30, 40, 50, 70, 100, 150, 200, 250, 300, 400, or 500 percent or more. In some embodiments, proactive pulsing of filtration systems herein can also include triggering cleaning pulses apart from thresholds being crossed or a time interval schedule.

Data Regarding Anticipated Changes in Filtration Performance/Filtration Demand

In various embodiments herein, filtration systems can be configured to proactively pulse clean filter elements and/or change pulse cleaning operation modes based on "anticipated change data". As such, the filtration systems can be prepared for the anticipated changes. The anticipated change data can include at least one of data regarding an anticipated change in filtration performance and data regarding an anticipated change in filtration system demand.

Changes Impacting Performance

In some embodiments, the data regarding an anticipated change in filtration performance includes data regarding an expected change in the weather and/or environmental conditions. Such changes can include changes in one or more of atmospheric precipitation, humidity (such as increased ambient humidity), fog, temperature, wind (including increased wind and/or wind speeds above a threshold value), airborne dust/sand (such as with sand storms).

In some embodiments, the data regarding an anticipated change in filtration system performance includes data regarding an expected change in filtration performance based upon historical system performance patterns (e.g., previously observed performance patterns based on the time of day, week, month, year, etc.). In some embodiments, the data regarding historical filtration performance of the filtration system can include previous instances of a measured pressure drop crossing a threshold value.

Changes Impacting Demand

In some embodiments, the data regarding an anticipated change in filtration system demand includes data regarding an expected change in the weather and/or environmental conditions. Such changes can include changes in one or more of humidity (such as increased humidity which may result in an increase in the use of air conditioning systems impacting a power grid), temperature (such as increased humidity which may result in an increase in the use of air conditioning systems impacting a power grid), wind (including decreased wind and/or wind speeds below a threshold value limiting wind-based inputs to a power grid), airborne dust/sand (such as with sandstorms) reducing solar radiation at the site of solar power generators, cloud cover/solar radiation (such as increases in cloud cover and decreases in solar radiation). In some embodiments, the data regarding an anticipated change in filtration system demand can include renewable energy generation forecast data.

In some embodiments, the data regarding an anticipated change in filtration system demand includes data regarding an expected change in filtration performance based upon historical system demand patterns (e.g., previously observed performance patterns based on the time of day, week, month, year, local sunrise time, local sunset time, etc.). For example, in some embodiments, a particular time of year, month, week or day can result in increased demands on the filtration system or filtration performance. For example, in the context of gas turbine systems providing electrical power, demand on power grids frequently ramps up in the morning hours and then peaks in the early evening hours, frequently near dusk before dropping sharply in the late evening hours. In the context of a production plant, certain operations creating dust or particulates may occur in greater frequency or intensity at certain times of the day, week, month, or year. In these cases, the system can be prepared for the anticipated changes in demand.

Various examples of changes impacting filtration system performance and filtration system demand (and therefore types of "anticipated change data" which can be used herein) are provided in Table 1 below.

TABLE 1

| Exemplary Changes Impacting Filtration System Performance | Exemplary Changes Impacting Filtration System Demand |
|---|---|
| Weather/Environmental Condition Forecast Data | Weather/Environmental Condition Forecast Data |
| Precipitation | Humidity |
| Humidity | Temperature |
| Fog | Cloud Cover/Solar Radiation |
| Temperature | Wind |
| Wind | Historical System Demand Patterns |
| Airborne Dust/Sand | |
| Historical System | Time of Day, Week, Month, |

TABLE 1-continued

| Exemplary Changes Impacting Filtration System Performance | Exemplary Changes Impacting Filtration System Demand |
|---|---|
| Performance Patterns | Year |
| Time of Day, Week, Month, Year | |

Data Flow Scenarios

Figure 8:
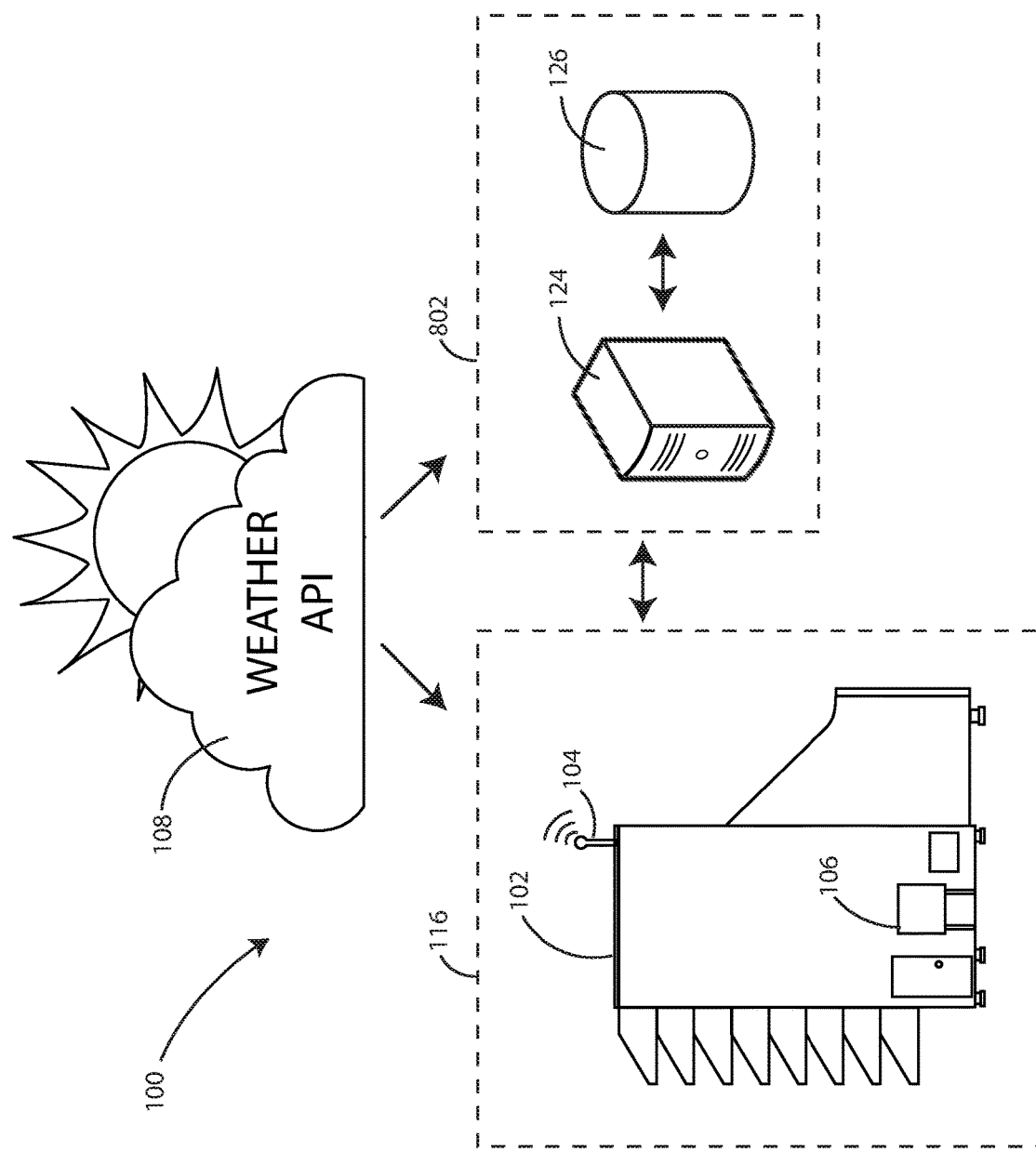
FIG. 8 is a schematic view of a filtration system data communication environment in accordance with various embodiments herein.

Referring now to FIG. 8, a schematic view of a filtration system data communication environment in accordance with various embodiments herein. In some embodiments, information can pass directly from a weather API 108 to a work environment 116 and a filtration system 102 therein. In some embodiments, logic described herein such as logic for proactively pulse cleaning can be fully implemented at the level of the work environment 116 or filtration system 102 therein. In some embodiments, information from the weather API 108 can go first to a remote environment 802 and then the information can be processed and, in some cases, selectively sent on to the work environment 116. However, in some embodiments, information from the weather API 108 can go to the remote environment 802 and only information regarding specific proactive changes in pulse cleaning such as specific changes to operating modes and/or operating parameters and/or threshold changes are sent to the work environment 116 and/or filtration system 102 therein from the remote environment 802.

In some embodiments, information (such as that coming directly from the API 108 or as passed from the remote environment 802) can be stored within the work environment 116 and/or the filtration system 102 therein. For example, weather information and/or related proactive cleaning operation instructions can be stored covering a period of time into the future such 24 hours, 48 hours, 72 hours, or longer. In various embodiments, if communication with the API 108 and/or with the remote environment 802 is not available, then filter system cleaning operations can be guided by the stored data. In various embodiments, filter system cleaning operations can be guided by weather or condition data gathered by sensors associated with the work environment 116 such as barometric pressure sensors, precipitation sensors, light sensors, wind sensors, and the like.

FURTHER EMBODIMENTS

In a first aspect, a filtration system is included having a filter element mount configured to retain a filter element, a compressed gas supply, and a valve in fluid communication with the compressed gas supply, wherein opening the valve results in a pulse of gas directed at the filter element. The filtration system can further include a control circuit configured to control the valve and a communications circuit. The communications circuit can receive data related to an anticipated change impacting the filtration system, the anticipated change data including at least one of data regarding an anticipated change in filtration performance and data regarding an anticipated change in filtration system demand. The control circuit can be configured to initiate opening the valve in response to a data input indicating that a pressure drop threshold has been crossed. The control circuit can be further configured to execute at least one operation based on the anticipated change data, the at least one operation including at least one of adjusting the pressure drop threshold based on the anticipated change data and initiating proactively opening the valve in the absence of the pressure drop threshold being crossed based on the anticipated change data.

In a second aspect, in addition to one or more of the preceding or following aspects, or in the alternative to some aspects, adjusting the pressure drop threshold based on the anticipated change data includes lowering the pressure drop threshold.

In a third aspect, in addition to one or more of the preceding or following aspects, or in the alternative to some aspects, the data regarding an anticipated change in filtration performance includes at least one of data regarding an expected change in environmental conditions, and data regarding historical filtration performance of the filtration system.

In a fourth aspect, in addition to one or more of the preceding or following aspects, or in the alternative to some aspects, the data regarding an expected change in environmental conditions can include weather forecast data.

In a fifth aspect, in addition to one or more of the preceding or following aspects, or in the alternative to some aspects, the data regarding an expected change in environmental conditions can include ambient humidity data.

In a sixth aspect, in addition to one or more of the preceding or following aspects, or in the alternative to some aspects, the data regarding an expected change in environmental conditions can include wind speed data.

In a seventh aspect, in addition to one or more of the preceding or following aspects, or in the alternative to some aspects, the data regarding an expected change in environmental conditions can include an expected sand storm.

In an eighth aspect, in addition to one or more of the preceding or following aspects, or in the alternative to some aspects, the data regarding an expected change in environmental conditions can include a local sunrise or sunset time.

In a ninth aspect, in addition to one or more of the preceding or following aspects, or in the alternative to some aspects, the data regarding an expected change in environmental conditions can include atmospheric precipitation.

In a tenth aspect, in addition to one or more of the preceding or following aspects, or in the alternative to some aspects, the data regarding an expected change in environmental conditions can include expected fog.

In an eleventh aspect, in addition to one or more of the preceding or following aspects, or in the alternative to some aspects, the data regarding historical filtration performance of the filtration system can include instances of a measured pressure drop crossing a threshold value.

In a twelfth aspect, in addition to one or more of the preceding or following aspects, or in the alternative to some aspects, the data regarding historical filtration performance of the filtration system can include daily, weekly or monthly filtration performance patterns.

In a thirteenth aspect, in addition to one or more of the preceding or following aspects, or in the alternative to some aspects, the data regarding an anticipated change in filtration system demand can include weather forecast data.

In a fourteenth aspect, in addition to one or more of the preceding or following aspects, or in the alternative to some aspects, the data regarding an anticipated change in filtration system demand can include solar radiation forecast data.

In a fifteenth aspect, in addition to one or more of the preceding or following aspects, or in the alternative to some aspects, the data regarding an anticipated change in filtration system demand can include renewable energy generation forecast data.

In a sixteenth aspect, in addition to one or more of the preceding or following aspects, or in the alternative to some aspects, the data regarding an anticipated change in filtration system demand can include a local sunset time.

In a seventeenth aspect, in addition to one or more of the preceding or following aspects, or in the alternative to some aspects, the filter element is selected from the group consisting of a filter cartridge and a filter bag.

In an eighteenth aspect, in addition to one or more of the preceding or following aspects, or in the alternative to some aspects, the compressed gas supply can include a gas supply manifold.

In a nineteenth aspect, in addition to one or more of the preceding or following aspects, or in the alternative to some aspects, the valve can include a solenoid operated valve.

In a twentieth aspect, in addition to one or more of the preceding or following aspects, or in the alternative to some aspects, the valve can include a diaphragm valve.

In a twenty-first aspect, in addition to one or more of the preceding or following aspects, or in the alternative to some aspects, the control circuit can include at least one of a microprocessor, a microcontroller, a field-programmable gate array (FPGA), or an application specific integrated circuit (ASIC).

In a twenty-second aspect, in addition to one or more of the preceding or following aspects, or in the alternative to some aspects, the system further can include a pressure sensor and at least one other sensor in electrical communication with the control circuit.

In a twenty-third aspect, in addition to one or more of the preceding or following aspects, or in the alternative to some aspects, the at least one other sensor selected from the group consisting of a barometric sensor, an ambient temperature sensor, a humidity sensor, and a light sensor.

In a twenty-fourth aspect, in addition to one or more of the preceding or following aspects, or in the alternative to some aspects, the filtration system is in fluid communication with an air intake of a gas turbine system.

In a twenty-fifth aspect, in addition to one or more of the preceding or following aspects, or in the alternative to some aspects, the filtration system forms part of an industrial air filtration system.

In a twenty-sixth aspect, in addition to one or more of the preceding or following aspects, or in the alternative to some aspects, initiating proactively opening the valve includes notifying a system operator.

In a twenty-seventh aspect, in addition to one or more of the preceding or following aspects, or in the alternative to some aspects, initiating proactively opening the valve includes sending a control signal to the valve.

In a twenty-eighth aspect, a filtration system is included having a filter element mount configured to retain a filter element, a compressed gas supply, a valve in fluid communication with the compressed gas supply, wherein opening the valve results in a pulse of gas directed at the filter element, a control circuit configured to control the valve, a communications circuit, wherein the communications circuit receives data related to an anticipated change impacting the filtration system, the anticipated change data can include at least one of data regarding an anticipated change in filtration performance, data regarding an anticipated change in filtration system demand, and wherein the control circuit is configured to initiate opening the valve according to a first mode of operation and a second mode of operation, wherein the first mode of operation includes opening the valve in response to a data input indicating that a pressure drop threshold has been crossed, wherein the second mode of operation includes opening the valve in response to a data input indicating that a pressure drop threshold has been crossed and at least one of: adjusting the pressure drop threshold based on the anticipated change data, and initiating proactively opening the valve in the absence of the pressure drop threshold being crossed based on the anticipated change data.

In a twenty-ninth aspect, in addition to one or more of the preceding or following aspects, or in the alternative to some aspects, the second mode of operation is only engaged if a filter element of a particular type is mounted on the filter element mount.

In a thirtieth aspect, in addition to one or more of the preceding or following aspects, or in the alternative to some aspects, initiating proactively opening the valve includes notifying a system operator.

In a thirty-first aspect, in addition to one or more of the preceding or following aspects, or in the alternative to some aspects, initiating proactively opening the valve includes sending a control signal to the valve.

In a thirty-second aspect, a networked filtration system is included having a filtration system can include a filter element mount configured to retain a filter element, a compressed gas supply, a valve in fluid communication with the compressed gas supply, wherein opening the valve results in a pulse of gas directed at the filter element, a local control circuit configured to control the valve, wherein the local control circuit is configured to initiate opening the valve in response to a data input indicating that a pressure drop threshold has been crossed, a communications circuit in signal communication with local control circuit, and a remote control system in communication with the filtration system remotely through a data network, wherein the remote control system sends instructions to the filtration system based on an anticipated change impacting the filtration system, the anticipated change can include at least one of an anticipated change in filtration performance, and an anticipated change in filtration system demand, the instructions including at least one of adjusting the pressure drop threshold, and initiating proactively opening the valve in the absence of the pressure drop threshold being crossed.

In a thirty-third aspect, in addition to one or more of the preceding or following aspects, or in the alternative to some aspects, initiating proactively opening the valve includes notifying a system operator.

In a thirty-fourth aspect, in addition to one or more of the preceding or following aspects, or in the alternative to some aspects, initiating proactively opening the valve includes sending a control signal to the valve.

In a thirty-fifth aspect, a networked filtration system is included having a filtration system can include a filter element mount configured to retain a filter element, a compressed gas supply, a valve in fluid communication with the compressed gas supply, wherein opening the valve results in a pulse of gas directed at the filter element, a local control circuit configured to control the valve, wherein the local control circuit is configured to initiate opening the valve in response to a data input indicating that a pressure drop threshold has been crossed, a communications circuit, and a remote control system in communication with the filtration system remotely through a data network, wherein the remote control system sends data to the filtration system regarding an anticipated change impacting the filtration system, the anticipated change can include at least one of an anticipated change in filtration performance, and an anticipated change in filtration system demand.

In a thirty-sixth aspect, in addition to one or more of the preceding or following aspects, or in the alternative to some aspects, initiating proactively opening the valve includes notifying a system operator.

In a thirty-seventh aspect, in addition to one or more of the preceding or following aspects, or in the alternative to some aspects, initiating proactively opening the valve includes sending a control signal to the valve.

In a thirty-eighth aspect, a method of operating a filtration system is included, the method including opening a valve that results in a pulse of gas directed at a filter element, wherein the valve is opened in response to a data input indicating that a pressure drop threshold has been crossed, calculating an anticipated change impacting the filtration system, the anticipated change can include at least one of an anticipated change in filtration performance, an anticipated change in filtration system demand, operating the valve based on the anticipated change can include at least one of adjusting the pressure drop threshold, and initiating proactively opening the valve in the absence of the pressure drop threshold being crossed.

In a thirty-ninth aspect, in addition to one or more of the preceding or following aspects, or in the alternative to some aspects, initiating proactively opening the valve includes notifying a system operator.

In a fortieth aspect, in addition to one or more of the preceding or following aspects, or in the alternative to some aspects, initiating proactively opening the valve includes sending a control signal to the valve.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A filtration system comprising:
    a filter element mount configured to retain a filter element;
    a compressed gas supply;
    a valve in fluid communication with the compressed gas supply, wherein opening the valve results in a pulse of gas directed at the filter element;
    a control circuit configured to control the valve;
    a communications circuit;
    wherein the communications circuit receives data related to an anticipated change impacting the filtration system, the anticipated change data comprising at least one of data regarding an anticipated change in filtration performance; and
    data regarding an anticipated change in filtration system demand;
    wherein the control circuit is configured to initiate opening the valve in response to a data input indicating that a pressure drop threshold has been crossed;
    wherein the control circuit is further configured to adjust the pressure drop threshold based on the anticipated change data.

2. The filtration system of claim 1, wherein adjusting the pressure drop threshold based on the anticipated change data comprises lowering the pressure drop threshold.

3. The filtration system of claim 1, wherein the data regarding an anticipated change in filtration performance includes at least one of
    data regarding an expected change in environmental conditions; and
    data regarding historical filtration performance of the filtration system.

4. The filtration system of claim 3, the data regarding an expected change in environmental conditions comprising at least one of weather forecast data, an expected change in environmental conditions comprising ambient humidity data, an expected change in environmental conditions comprising wind speed data, an expected change in environmental conditions comprising an expected sand storm, an expected change in environmental conditions comprising a local sunrise or sunset time, an expected change in environmental conditions comprising atmospheric precipitation, and an expected change in environmental conditions comprising expected fog.

5. The filtration system of claim 3, the data regarding historical filtration performance of the filtration system comprising instances of a measured pressure drop crossing a threshold value.

6. The filtration system of claim 3, the data regarding historical filtration performance of the filtration system comprising daily, weekly or monthly filtration performance patterns.

7. The filtration system of claim 1, the data regarding an anticipated change in filtration system demand comprising at least one of weather forecast data, solar radiation forecast data, renewable energy generation forecast data, and a local sunset time.

8. The filtration system of claim 1, wherein the filter element is selected from the group consisting of a filter cartridge and a filter bag.

9. The filtration system of claim 1, the compressed gas supply comprising a gas supply manifold.

10. The filtration system of claim 1, further comprising a pressure or and at least one other sensor in electrical communication with the control circuit, the at least one other sensor selected from the group consisting of a barometric sensor, an ambient temperature sensor, a humidity sensor, and a light sensor.

11. The filtration system of claim 10, wherein the control circuit is configured to use the at least one other sensor to confirm an anticipated change.

12. The filtration system of claim 11, wherein the control circuit is configured to use the at least one other sensor to confirm the humidity or the wind speed.

13. The filtration system of claim 1, wherein the filtration system is in fluid communication with an air intake of a gas turbine system.

14. The filtration system of claim 1, wherein the filtration system forms part of an industrial air filtration system.

15. The filtration system of claim 1, wherein adjusting the pressure drop threshold based on the anticipated change data comprises:
lowering the pressure drop threshold from a default pressure drop threshold to a lowered pressure drop threshold;
after a predetermined time has elapsed, raising the pressure drop threshold from the lowered pressure drop threshold to the default pressure drop threshold.

16. The filtration system of claim 1, the anticipated change data comprising expected daily variation in demand on a power grid.

17. The filtration system of claim 1, wherein the filtration system further comprises an accelerometer configured to detect vibrations transmitted from or within the filtration system and to detect when the valve is opened.

18. A filtration system comprising:
a filter element mount configured to retain a filter element;
a compressed gas supply;
a valve in fluid communication with the compressed gas supply, wherein opening the valve results in a pulse of as directed at the filter element;
a control circuit configured to control the valve;
a communications circuit;
wherein the communications circuit receives data related to an anticipated change impacting the filtration system, the anticipated change data comprising at least one of
data regarding an anticipated change in filtration performance; and
data regarding an anticipated change in filtration system demand;
wherein the control circuit is configured to initiate opening the valve according to a first mode of operation and a second mode of operation;
wherein the first mode of operation includes opening the valve in response to a data input indicating that a pressure drop threshold has been crossed;
wherein the second mode of operation includes opening the valve in response to a data input indicating that an adjusted pressure drop threshold has been crossed; and
wherein the adjusted pressure drop threshold is based on an adjustment of adjusting the pressure drop threshold based on the anticipated change data, and
wherein the second mode of operation is only engaged if a filter element of a particular type is mounted on the filter element mount.

19. The filtration system of claim 18, wherein the filter element comprises an identification element and the filter element mount comprises an identification reader, wherein the identification reader is configured to determine whether or not the filter element is of the particular type.

20. A networked filtration system comprising:
a filtration system comprising
a filter element mount configured to retain a filter element;
a compressed gas supply;
a valve in fluid communication with the compressed gas supply, wherein opening the valve results in a pulse of gas directed at the filter element;
a local control circuit configured to control the valve;
wherein the local control circuit is configured to initiate opening the valve in response to a data input indicating that a pressure drop threshold has been crossed;
a communications circuit in signal communication with the local control circuit; and
a remote control system in communication with the filtration system remotely through a data network;
wherein the remote control system sends instructions to the filtration system based on an anticipated change impacting the filtration system, the anticipated change comprising at least one of
an anticipated change in filtration performance; and
an anticipated change in filtration system demand;
the instructions including adjusting the pressure drop threshold.

* * * * *